July 3, 1928.

B. N. BROIDO 1,675,329

APPARATUS FOR JOINING PIPES

Filed June 21, 1926

BENJAMIN N. BROIDO. INVENTOR.

BY O. V. Thiele

ATTORNEY.

Patented July 3, 1928.

1,675,329

UNITED STATES PATENT OFFICE.

BENJAMIN N. BROIDO, OF NEW YORK, N. Y., ASSIGNOR TO THE SUPERHEATER COMPANY, OF NEW YORK, N. Y.

APPARATUS FOR JOINING PIPES.

Application filed June 21, 1926. Serial No. 117,471.

This invention relates to structures and processes such as those described in the United States Patent 1,169,209, granted on January 25th, 1916, to C. H. True and N. T. McKee, and has for its purpose the extension and improvement of the process and apparatus described in that patent.

Figure 1:
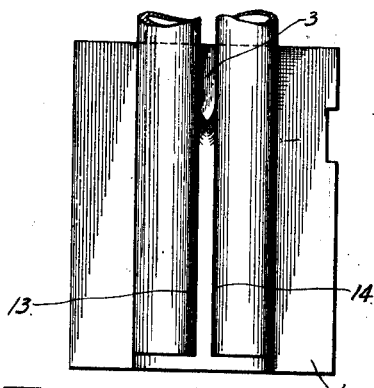
Figure 2:
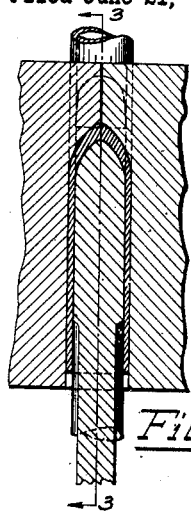
Figure 3:
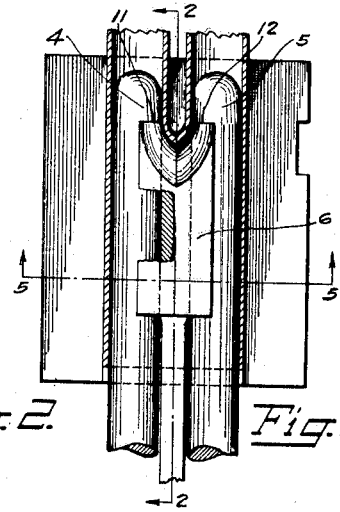
Figure 4:
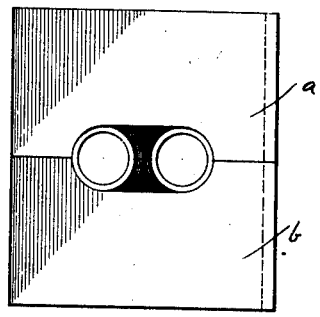
Figure 5:
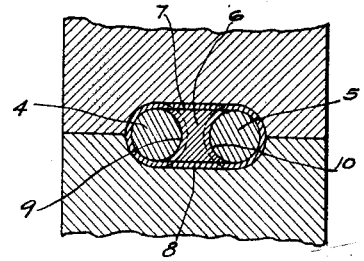
Figure 6:
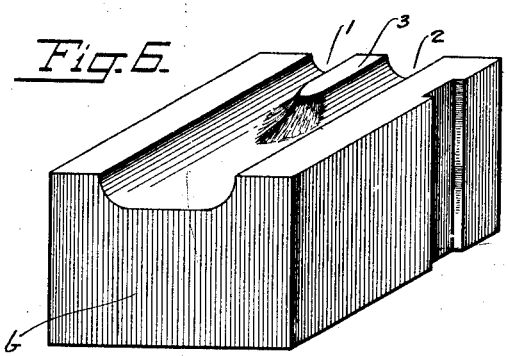
Figure 7:
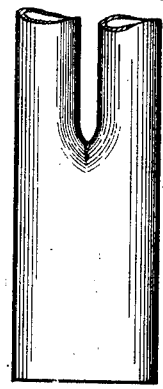

The invention is illustrated in the accompanying single sheet of drawings in which Fig. 1 shows one half of the female die with the pipes that are to be joined in this process in position; Fig. 2 is a section on line 2—2 of Fig. 3, both halves of the female die, however, being illustrated; Fig. 3 is a section on line 3—3 of Fig. 2; Fig. 4 is an end view of Fig. 1 from the open end of the die, both halves of the die appearing in this figure; Fig. 5 is a sectional view on line 5—5 of Fig. 3; Fig. 6 is a projected view of one half of the female die, while Fig. 7 shows the completed product of the method herein disclosed.

Familiarity is assumed herein with the process described in the above mentioned United States Patent 1,169,209, which process is now very extensively used for joining pipes, particularly for use in connection with superheaters. The process may, however, for convenience, be briefly described here as follows:

The two pipes which are to be joined are clamped together in the relative position they are to occupy in the completed product; are then heated to a welding heat over those areas where the operation is performed; are next placed into a die of suitable conformation after which the male die performs its stroke which results in a splitting of the adjacent pipe walls and a bending outward of the portions adjacent to the split and the simultaneous welding of the edges of one to those of the other. The resulting product is similar to that illustrated in Fig. 7 of the present application. The two pipes are seen to be welded together into a unitary structure which may be said to be an incomplete return bend, inasmuch as it is a structure of that class except for the fact that the joined end is still open. For use in connection with superheaters, the succeeding operation is to close this open end in some suitable manner. Structures of this sort, however, have application where it is desirable instead of closing the end to draw it down to a rounded shape and to connect this end to serve as an inlet or outlet for steam, water or other fluid. When applied to this use, the length for which the pipes are joined should preferably be considerable and when an attempt is made to produce this considerable length of the joined part by the process disclosed in the above named patent, trouble is occasionally experienced by pipe material sticking to the male die and being carried inward by the die in its travel, causing the heated pipes to collapse and crumple. The object of the present invention is to provide apparatus and a method for producing such a jointed structure in which the jointed part may be as long as desired without any danger of the pipes collapsing or crumpling during the operation.

The apparatus used for this purpose comprises three essential elements. The first of these is a female die which is in two symmetrical parts $a$ and $b$ (see particularly Fig. 4). The lower half of the die is illustrated in an isometrical view in Fig. 6. The upper half, it will be understood, is symmetrical with this. When the two are in closed position they present two cylindrical bores, 1 and 2, separated by a partition 3. This partition is removed for a certain distance from one end of the die as will be apparent from Fig. 6 and as is well understood by those versed in this art. This die is similar in every respect to the one used in the prior art, except that it can and, in practice, will be made much longer than was possible in the past. The partition 3 remains of about the former length while the portion over which it is removed is made as long as desired.

The pipes are illustrated in position in this die in Fig. 1 before the operation on them has been performed.

The second essential part of the apparatus is a pair of cylindrical rods 4 and 5. These are of such length that they extend practically through the entire die, their size being such that they fit snugly into the two pipes. They are inserted into the pipes and held stationary in them during the operation by any suitable means.

The third essential part referred to is the male die 6. The shape of this will be apparent from Figs. 3 and 5. It is bounded by the two parallel planes 7 and 8, which are tangent to the rods 4 and 5, and by the curved surfaces, 9 and 10, of these two rods.

At its inward end, this die is bevelled off along the curved lines, 11 and 12, to edges adjacent to the rods, 4 and 5. This male die slides on the rods, 4 and 5, during the operation by means of the grooves engaging the curved parts, 9 and 10, of the rods. The die, 6, is given the required stroke by any suitable mechanism.

The process will now be readily understood. The pipes are heated to a welding heat, placed in the position indicated in Fig. 1, while the two halves of the female die are open; the female die is then closed; the rods, 4 and 5, are inserted and held in position by a suitable mechanism and the male die, 6, then performs its stroke. During this stroke the pipes, 1 and 2, are split along the juxtaposed portions of their walls, 13 and 14, and these split portions are bent outward and come into forcible contact with each other as the die moves along, thereby becoming welded together. These concomitant steps occur with this modified apparatus in essentially the same manner as with the old apparatus. Any collapsing or folding of the walls, however, is entirely prevented by the presence of the two stationary rods, 4 and 5, the length to which the joining can be carried not being limited by any danger of such accidents. All that is necessary is that the die, as well as the rods, are made of the necessary length and that the die 6, is given a sufficiently long stroke.

One of the advantages of the present invention over the method and apparatus as hitherto used, is that the combined cost of the male die and rods is considerably less than the cost of the male die of the form used hitherto.

In practicing my method or in making apparatus for carrying it out, some variations from the method and apparatus hereinabove described will naturally occur. Thus, the rods, instead of being solid, may be hollow; that is, they may be pipes; these rods may be inserted manually and not held in place during the operation except by the friction between them and the pipes; etc. Such variations are meant to be covered by the appended claims in so far as they are within the spirit of the present invention.

What I claim is:—

1. Apparatus for making pipe structures of the kind described, comprising two parallel cylindrical bars extending into and remaining stationary in the pipes during the process, and a reciprocating male die having grooves slidingly engaging said bars during the process.

2. Apparatus for making pipe structures of the kind described, comprising two parallel cylindrical bars extending into and remaining stationary in the pipes during the process, and a reciprocating male die having grooves slidably engaging, said bars during the process, said male die being bevelled off to a curved edge adjacent to each bar.

3. Apparatus for making pipe structures, of the kind described, comprising a female die, two cooperating rods, and a cooperating male die; the female die having two parallel bores for holding two pipe lengths, said bores being joined by a space opening from one end of the die; the two rods being cylindrical and of a size to fit snugly into the two pipes; the male die being bounded by the two parallel common tangent planes to the rods, and their cylindrical surfaces.

4. Apparatus for making pipe structures of the kind described, comprising a female die, two cooperating rods, and a cooperating male die; the female die including two symmetrical halves, whose adjacent faces are of such conformation that in their closed position they have two parallel bores for holding two pipe lengths to be joined, said bores being joined by a space opening from one end of the die; the two rods being cylindrical and of a size to fit snugly into the two pipes; the male die being bounded by the two parallel common tangent planes to the rods and their cylindrical surfaces and being bevelled off to a curved edge adjacent to each bar.

BENJAMIN N. BROIDO